United States Patent
Balduin et al.

(10) Patent No.: US 10,662,105 B2
(45) Date of Patent: May 26, 2020

(54) HEATING OBJECTS ON A LINE-PRODUCTION OVEN

(75) Inventors: Michael Balduin, Alsdorf (DE); Benno Dunkmann, Liege (BE); Michael Labrot, Aachen (DE); Karl-Josef Ollfisch, Roetgen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1535 days.

(21) Appl. No.: 12/302,374

(22) PCT Filed: May 21, 2007

(86) PCT No.: PCT/FR2007/051306
§ 371 (c)(1),
(2), (4) Date: Jan. 15, 2009

(87) PCT Pub. No.: WO2007/138214
PCT Pub. Date: Dec. 6, 2007

(65) Prior Publication Data
US 2009/0197215 A1    Aug. 6, 2009

(30) Foreign Application Priority Data

May 26, 2006  (DE) .......................... 10 2006 024 484

(51) Int. Cl.
*F27D 3/12* (2006.01)
*C03B 23/025* (2006.01)
(Continued)

(52) U.S. Cl.
CPC .......... *C03B 23/0258* (2013.01); *C03B 29/08* (2013.01); *C03B 35/202* (2013.01); *Y02P 40/57* (2015.11)

(58) Field of Classification Search
USPC ........... 432/11, 207, 246; 65/29.1, 106, 107; 392/436
See application file for complete search history.

(56) References Cited

U.S. PATENT DOCUMENTS 2,867,431 A * 1/1959 Hess ............................... 432/12
2,965,742 A * 12/1960 Joeckel .................... H05B 3/66
219/395
(Continued)

FOREIGN PATENT DOCUMENTS

BE    2005/0130    *   3/2005
EP    0 928 779        7/1999
(Continued)

OTHER PUBLICATIONS

Japanese Office Action dated Jul. 31, 2012 in Patent Application No. 2009-511557 with English Translation.
(Continued)

*Primary Examiner* — Steven B McAllister
*Assistant Examiner* — John E Bargero
(74) *Attorney, Agent, or Firm* — Oblon, McClelland, Maier & Neustadt, L.L.P.

(57) ABSTRACT

A device for heating objects and a method that has recourse to the device, particularly for heating and/or bending one or more glass panes positioned one on top of the other, covering each other. The device includes a furnace line, plural supports, particularly transport molds that transport and/or bend the objects, the objects being placed on the supports positioned on transport carriages, a drive device that progresses the transport carriages through the furnace line and plural heating elements provided above the objects in the furnace line. In the device the heating elements are positioned on the whole above the entire furnace line and the heating elements can be operated and regulated so as to form heating zones suited to dimensions of the objects.

12 Claims, 5 Drawing Sheets

Figure 1A:
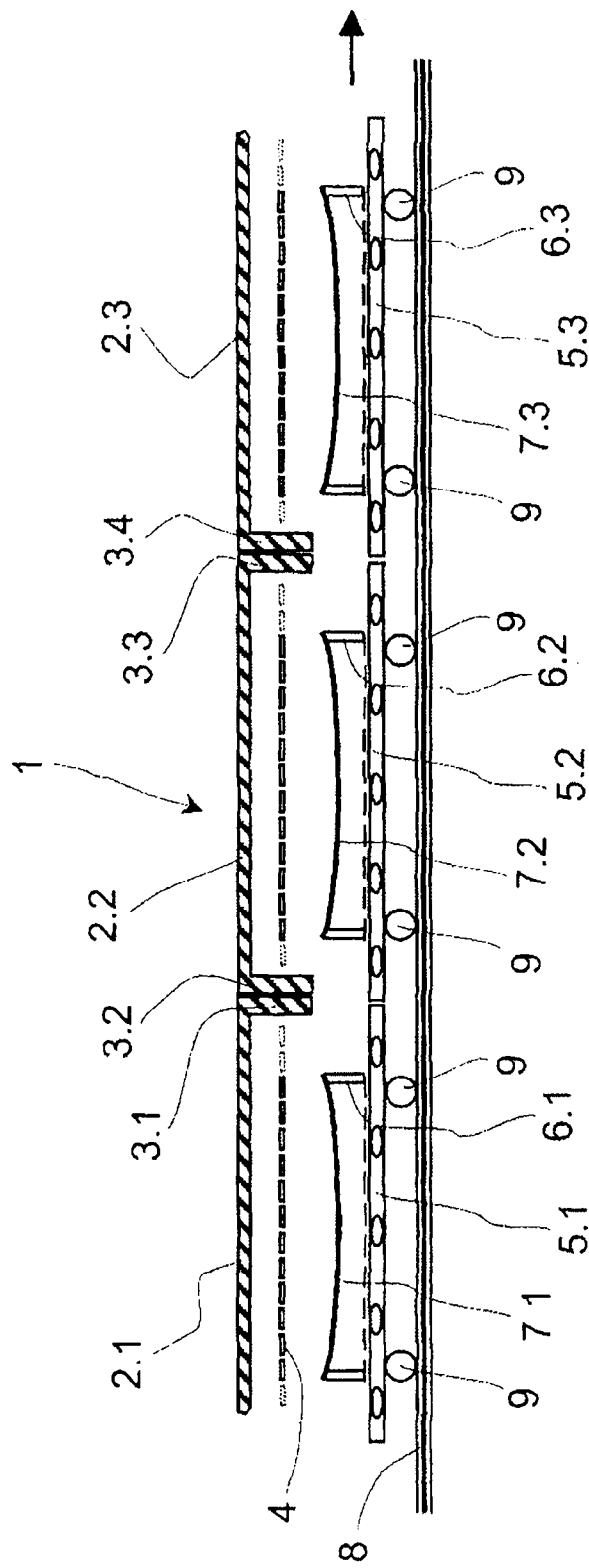

(51) Int. Cl.
  *C03B 35/20* (2006.01)
  *C03B 29/08* (2006.01)

(56) References Cited

U.S. PATENT DOCUMENTS

| | | | |
|---|---|---|---|
| 3,260,835 A * | 7/1966 | Soukey et al. | 219/213 |
| 4,361,428 A | 11/1982 | Bartusel et al. | |
| 4,497,645 A | 2/1985 | Peltonen | |
| 4,601,743 A | 7/1986 | Canfield | |
| 4,952,227 A | 8/1990 | Herrington et al. | |
| 4,957,532 A | 9/1990 | Jacobson et al. | |
| 5,352,263 A * | 10/1994 | Kuster et al. | 65/106 |
| 5,470,367 A * | 11/1995 | Salonen et al. | 65/162 |
| 5,695,537 A * | 12/1997 | Sykes | 65/106 |
| 5,830,253 A * | 11/1998 | Kuster et al. | 65/273 |
| 5,876,477 A * | 3/1999 | Bennett et al. | 65/273 |
| 5,902,367 A * | 5/1999 | Salonen | 65/29.1 |
| 6,092,393 A * | 7/2000 | Mathivat et al. | 65/106 |
| 6,240,746 B1 * | 6/2001 | Maeda et al. | 65/29.11 |
| 6,983,624 B2 * | 1/2006 | Yli-Vakkuri | 65/274 |
| 7,155,939 B2 * | 1/2007 | Yli-Vakkuri | 65/349 |
| 7,240,519 B2 * | 7/2007 | Schwartz et al. | 65/104 |
| 2008/0134721 A1 * | 6/2008 | Maeda | 65/29.1 |
| 2008/0134723 A1 * | 6/2008 | Maeda | 65/106 |

FOREIGN PATENT DOCUMENTS

| | | |
|---|---|---|
| JP | 6-17242 B2 | 3/1994 |
| JP | 07053229 | 2/1995 |
| JP | 07-277754 A | 10/1995 |
| JP | 10-29829 A | 2/1998 |
| JP | 2002-504475 A | 2/2002 |
| JP | 2002-293555 A | 10/2002 |
| JP | 2003-172583 A | 6/2003 |
| JP | 2004-333075 A | 11/2004 |
| KR | 10-2001-0034543 | 4/2001 |
| WO | WO 99/43624 A1 | 9/1999 |
| WO | 2006 095007 | 9/2006 |

OTHER PUBLICATIONS

Office Action dated Aug. 20, 2013, in Japanese Patent Application No. 2009-511557 with English translation.

Japanese Office Action dated Apr. 28, 2015 in Japanese Patent Application No. 2014-146937.

* cited by examiner

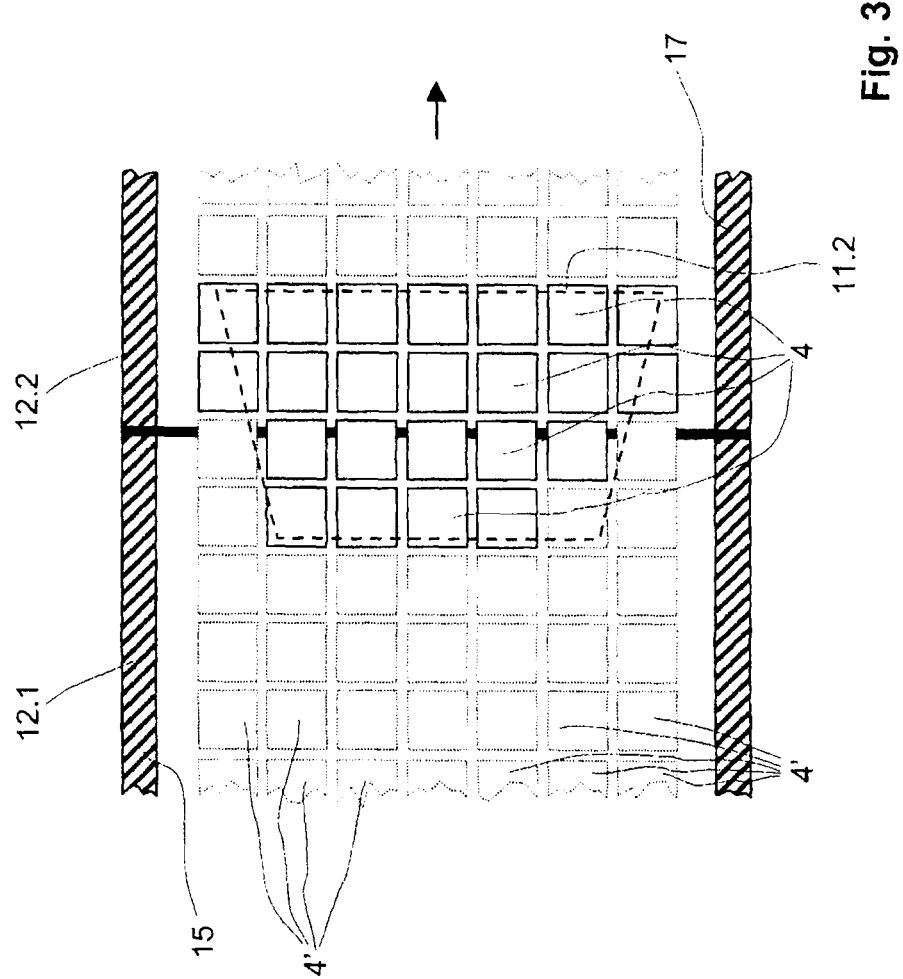

HEATING OBJECTS ON A LINE-PRODUCTION OVEN

CROSS-REFERENCE TO RELATED APPLICATIONS

The present application is the U.S. counterpart of WO 2007/138,214, and claims priority to German Application Number 10 2006 024 484.2, filed on May 26, 2006, the entire contents of each of which are hereby incorporated herein by reference.

The invention relates to a device and a method for heating objects and, in particular, for heating and/or bending one or more glass panes positioned one on top of the other.

European patent EP0736498B1 discloses a method for transporting mold-bearing carriages in a glass bending furnace. The bending furnace contains pre-heating chambers and several bending chambers positioned downstream of the forward chambers, and also cooling chambers positioned below the preheating chambers and the bending chambers. The mold-bearing carriages are thus conveyed one behind another along an upper track and transferred on to a lower track once the glass panes have been under the effect of gravity. The mold-bearing carriages are transported jerkily, that is to say that the carriages remain stationary for a certain period of time in the various chambers and are then progressed simultaneously in the manner of a train. Within the bending furnace, the carriages are transported back and forth in opposite directions of transport. The individual chambers are separated from one another in the way depicted in FIG. 1 (prior art according to EP0736498B1) and FIG. 2, and the mold-bearing carriages are additionally provided with transverse walls separating them from the next chamber. According to the teachings of EP0736498B1, once they have been transferred on to the lower track, the mold-bearing carriages are transferred directly into a position situated below the first bending chamber or directly below the final preheating chamber, while the other mold-bearing carriages remain stationary.

European patent application EP1236692A2 discloses a device for heating, bending and cooling glass panes, which device comprises an upper stage and a lower stage and successive bending carriages. The upper stage of the device consists of several heating chambers and, in the direction in which the bending carriages are transported, the last chamber is a bending chamber. The lower stage consists of a series of cooling chambers positioned under the bending chambers. The bending carriages have a structure that is open at the top or, put another way, a bottom that is a good conductor of heat. A pre-bending chamber is positioned upstream of the bending chamber. Resistive heating elements which heat the glass panes are positioned in the roof of the heating and bending chambers, the individual chambers being separated from one another in their roof by wall-like projections. In these zones, there are no heating elements. According to the invention, the pre-bending chambers and at least the last heating chamber are provided in their bottoms with heating elements which heat the glass panes from beneath through the bottoms of the bending carriages.

The problem underlying the invention is that of proposing an improved and more flexible device, and another method for heating objects, particularly for bending glass panes.

According to the invention, this problem is solved using the features of the independent device claim as far as the device is concerned, and using the features of the independent method claim as far as the method is concerned. The secondary claims which are dependent on the independent claims provide advantageous embodiments of the invention.

In the description which follows, it is possible for device features to be mixed with method features because some parts of the device can be explained only by reference to steps in the method.

In that which follows, the invention will be described primarily in its application to the heating and bending of glass panes, but it must be understood that the heating principle according to the invention can be applied to the heating of other objects, such as ceramics for example. Thus, in particular, the objects circulating through the device according to the invention are glass panes positioned horizontally on supports which are transport molds, each transport mold bearing one or several glass panes positioned one on top of the other covering each other.

The device according to the invention, for heating objects (particularly for heating and/or bending one or more glass panes situated one on top of the other covering each other) comprises a furnace line. The furnace line may be made as a single component and therefore produced in one piece, or may be divided into several chambers. The latter form of construction is customarily employed because it exhibits advantages in terms of construction. This is because smaller sized components are easier to handle and also because dividing the furnace line into chambers allows the furnace to be built from more or less identical modules. In the case of the heating of glass panes, the furnace line is usually functionally subdivided into heating zones and pre-bending and final bending zones.

In the context of a bending method, the glass panes are heated to their softening temperature by known electric resistive heating elements, possibly assisted by convective heating. Of course, other ways of heating the glass panes are possible, for example heating them by gas. A cooling path which, as already indicated in the prior art described at the beginning, may be situated below the heating and bending zones but which may equally be connected thereto in their plane, follows the final bending zone.

The supports for the objects (particularly transport molds) positioned on their transport carriage may be progressed in a train through the entire device and the final cooling path, but it is also possible to have separate trains of carriages for, on the one hand, heating (and, as appropriate, pre-bending) and, on the other hand, cooling, preceded as appropriate by final bending of, the objects (particularly glass panes), in the manner described in the applicant's patent application WO 2006/075117. The glass panes are pre-bent by bending glass panes, heated to the bending temperature and positioned on their transport mold, under the action of gravity. Final bending may be performed under the action of gravity, but compression bending (document EP1391432A1) and suction bending, or a combination of both forms of bending methods (document WO02/64519A1) are also known.

According to the invention, the heating elements of the furnace line produced in the manner of a tunnel furnace are operated according to the size and position of the objects (particularly glass panes) and therefore of the object supports (particularly transport molds). The heating zones are therefore no longer associated with heating zones or chambers which are defined and dictated at the time of construction of the device but are defined for each size of object (particularly a glass pane) and therefore free of the constraints governing the structural subdivision of the furnace line. The furnace line of the device according to the invention is generally not produced as a single piece but, in the customary method of construction, is produced in the form of various chambers connected to one another in series. Unlike furnace lines of the prior art, the heating zones are not associated with predetermined chambers of the device. The actual heating elements proper have, of course, to be relatively small in size and to be positioned very close together in order to be able to form all the partial zones that can be regulated sufficiently to suit the size of the objects (particularly glass panes) that are to be manufactured, such that the objects can be heated in various ways.

The heating elements are advantageously positioned uninterrupted along the roof and/or the bottom, and possibly also along the sides of the furnace line. When the furnace line is made up of separate chambers which have wall-like or cornice-like projections or recesses at their ends, these zones are also occupied by small heating elements. It is only by proceeding in this manner that the entire length of the furnace line can be occupied by heating zones suited to the size of the objects (particularly of the glass panes) subdivided by regulation. When the boundaries between the chambers do not exhibit projections or recesses, the heating elements can obviously also be placed uninterruptedly along the path along which the objects (particularly the glass panes) are transported.

The objects are placed on supports, each support being placed on a transport carriage. The transport carriages, and therefore also the supports carried by the transport carriages, travel one behind another through the device according to the invention. Each support bears an object, it being understood that an object may be a glass pane or several glass panes juxtaposed with one another. The support may in particular be a transport mold, particularly for at least one glass pane. In this case, the transport mold also has the function of imparting its shape to the object it bears, such as one or more glass panes positioned one on top of the other. By passing through the device according to the invention, the glass pane or panes is or are heated to its or their softening temperature and sags or sag under the effect of its or their own weight, to adopt the shape of the transport mold.

In an advantageous development of the invention, the transport carriages are essentially suited to the size of the smallest objects (particularly glass panes) to be heated or bent and therefore to their support (particularly transport mold). Since a single type of transport carriage is used for all sizes of object (particularly a glass pane), what that means is that the supports (particularly transport molds) for the larger objects overhang the transport carriages.

In the bending devices of the prior art, the length of the transport carriages is suited to the length of the chambers of the furnace and therefore to the largest glass pane that has to undergo the bending operation. The device of the prior art is therefore always equipped with the same number of transport carriages and therefore of glass panes irrespective of the size of the panes. Each chamber only ever contains one single glass pane, because the panes cannot be heated in the region of a chamber boundary. If relatively small glass panes are being bent, a large proportion of the furnace line remains unused. That means that the capacity of the furnace and therefore the number of glass panes passing through the furnace per unit time are, in practice, constant for all sizes of pane, even though there is enough space in the furnace line for a larger number of panes. The same is obviously also true of the cooling path which customarily follows the furnace line.

By contrast, by packing the objects (particularly glass panes) in more densely, independently of the chamber boundaries, the device according to the invention makes it possible to obtain better use both of the furnace line and of the cooling path normally connected thereto. The furnace line and the cooling path can therefore be made shorter than they usually are, thus also making it possible to reduce the floor space and therefore the investment required for the device. If the object (particularly a glass pane) density is higher in the heating (particularly bending) device according to the invention, in most cases greater heating or cooling power per unit length is needed than in bending devices of the prior art, although the total power required obviously does not generally differ.

The transport molds are preferably configured in the form of frames, that is to say that the objects (particularly glass panes) are borne by the transport mold only in a certain zone which runs around their periphery. Let us mention in this respect that, in the device according to the invention, it is obviously possible to use transport molds of appropriate type, for example concave solid molds.

All the transport carriages or the supports (particularly transport molds), when these overhang the transport carriages, can be contiguous with one another without interruption, which means that only the last carriage entering the furnace line needs to be pushed forward in the direction of transport for the entire train to be progressed by the distance over which the first carriage is pushed forward. It is also possible to conceive of pulling the train of carriages through the furnace line using a hauling machine, the last transport carriage or the last support (particularly transport mold) being extracted from the exit of the furnace line and, in this way, the other transport carriages coupled to the last and situated in the furnace line are progressed forward. It is also entirely possible for the transport carriages situated in the furnace line to be driven individually. The drive devices can act on the transport carriages from the outside, but the various transport carriages may also each be provided with their own drive means. In this case, the transport carriages do not need to be contiguous with one another and the forward travel is generally less jerky. When the transport carriages each have their own drive means, they can be progressed at different speeds through different parts of the furnace line and can thus have different residence times in certain heating zones. That makes it possible to obtain a very highly controlled heating curve and/or a precise distribution of temperature in the glass panes.

It is also possible to use wheel-less transport carriages, for example when these are placed on a conveyor belt, a bed of driven rolls, wheels or transport chain, and progressed through the furnace line in this way. The carriages may then be contiguous with one another or may be spaced apart from each other on the transport means.

The transport carriages may be progressed step by step through the furnace line, in the customary way, that is to say that all the carriages pause for the fixed duration of a defined step and are then progressed by the length of one carriage before pausing again for the duration of one step. A method such as this is of the "discontinuous" type.

According to the invention, the transport carriages may, however, also pass smoothly along the transport path, without pausing, at a uniform or variable speed. In this case, the heating elements associated therewith and therefore the zone which has the defined distribution needed for heating has evidently to progress by the same distance with the transport mold and therefore with the glass pane. It is therefore necessary to have "traveling" heating zones which are synchronized to the movement of the objects (particularly glass panes).

In this case, it is also possible to conceive of hybrid ways of progressing the transport carriages such that, in certain parts of the furnace line, the transport carriages are progressed step by step (otherwise known as: discontinuously, jerkily) while, by contrast, in other parts, they are progressed continuously.

Figure 1B:
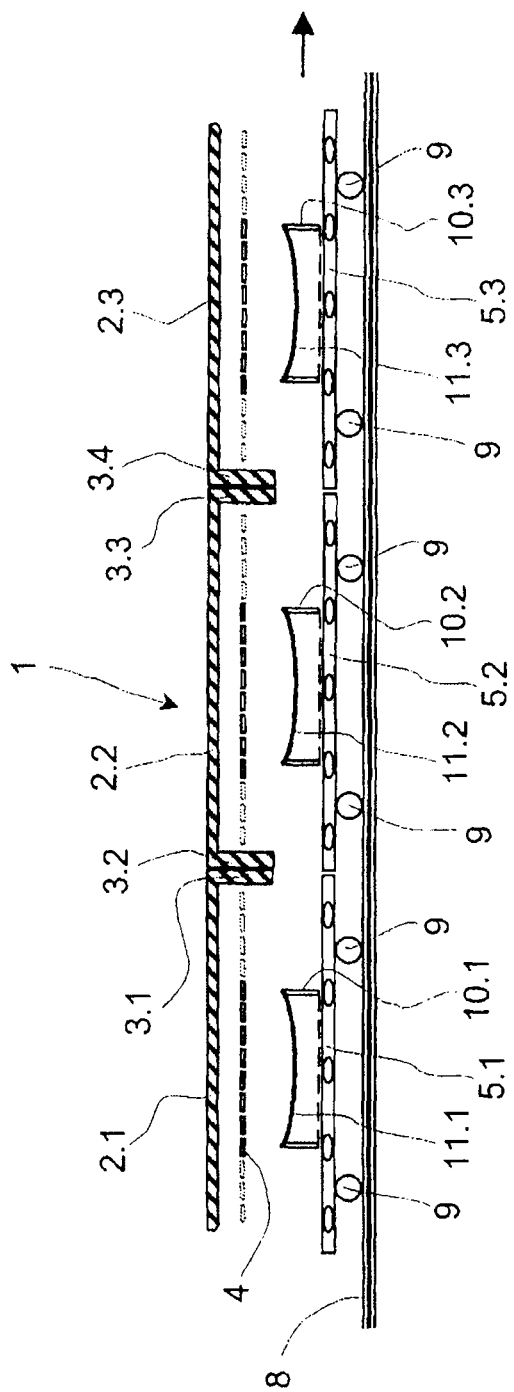
Figure 2A:
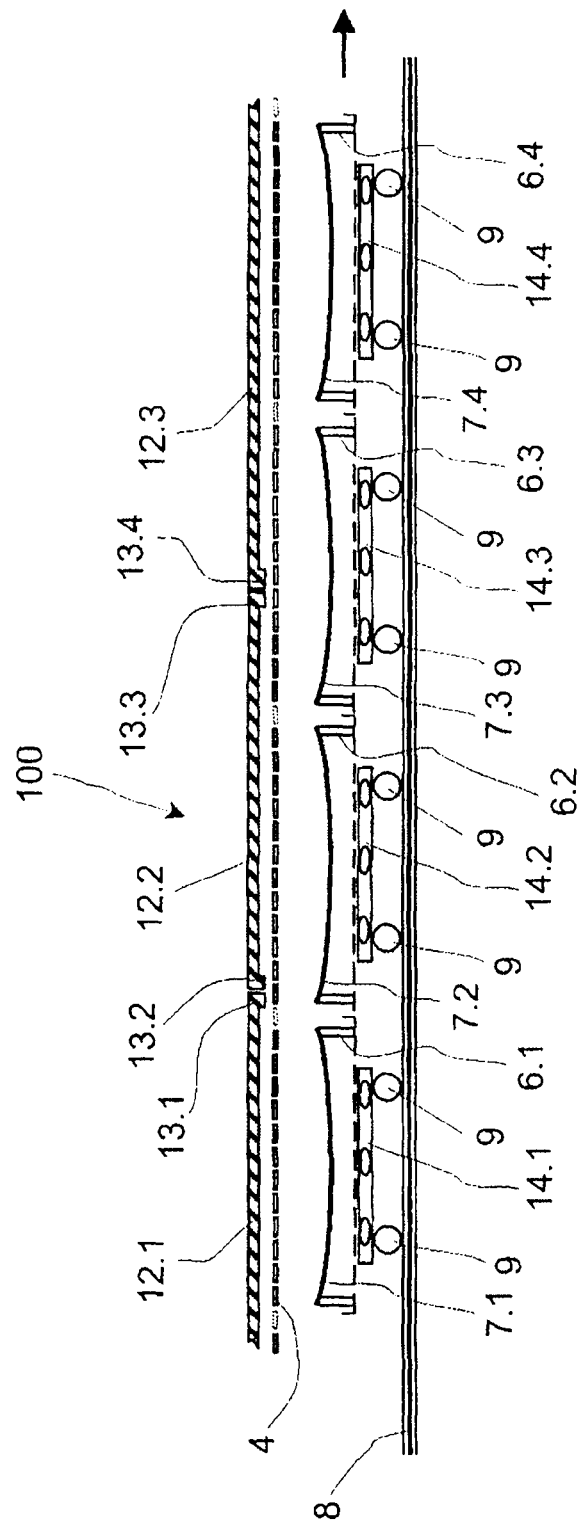
Figure 2B:
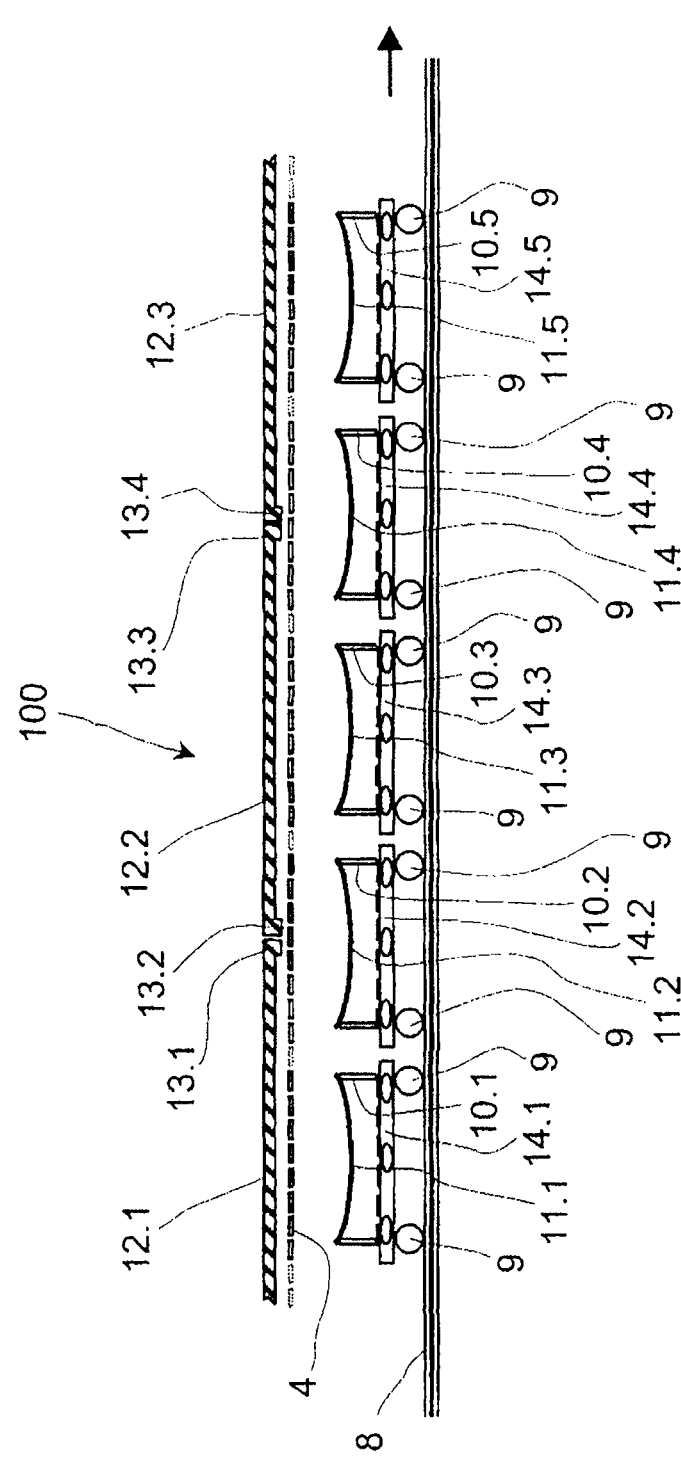

Other details and advantages of the subject matter of the invention, which are given without any intention to be restrictive, will emerge from the drawings of embodiments of a device for heating and/or bending one or more glass panes positioned one on top of the other according to the present invention, and from the description thereof given hereinbelow. In the drawings, and in simplified schematic depictions not drawn to scale:

FIG. 1a depicts a cross section of a heating and/or bending device of the prior art, laden with relatively large glass panes, FIG. 1b depicts a cross section of a heating and/or bending device of the prior art, laden with relatively small glass panes, FIG. 2a depicts a cross section through a heating and/or bending device according to the invention, laden with relatively large glass panes, FIG. 2b depicts a cross section through a heating and/or bending device according to the invention, laden with relatively small glass panes and FIG. 3 depicts a horizontal section through part of the heating and/or bending device according to the invention.

In the drawings which follow, the same components are always given the same numerical reference.

In FIG. 1a, a known device 1 for heating and bending glass panes is made up of several chambers of which just three chambers 2.1, 2.2 and 2.3 have been depicted here. The chambers are separated from one another by downwardly-protruding projections 3.1 to 3.4. The projections 3.1 to 3.4 also form zones where heating elements 4, otherwise distributed at the surface of the roof of the chambers, are interrupted. The heating elements 4 are not only positioned in small cells in the direction of transport indicated on the drawing by an arrow, but also transversely with respect to the direction in which the glass panes are transported.

In each of the chambers of the device 1 there is a transport carriage 5.1, 5.2, 5.3 provided with its respective transport mold 6.1, 6.2 and 6.3. The transport molds transport pairs of glass panes 7.1, 7.2 and 7.3 positioned one above the other covering each other. The term "transport mold" does not restrict the function of these transport molds and, on the contrary, the transport molds are generally also used while heating and cooling the glass panes positioned thereon.

The transport carriages 5.1, 5.2 and 5.3 are provided with wheels 9 which are guided by means of rails 8 and if possible allow jerk-free transport through the furnace line.

The transport carriages 5 are usually suited to the length of the chambers 2 of the furnace and cannot therefore be replaced with transport carriages suited to the size of the transport molds. In the event of adaptation, the pairs of glass panes would in fact enter the zone of the unheated projections 3, which means that they would be heated unevenly. In the known device, this can be avoided only by using a whole number of transport carriages for each chamber in the furnace.

FIG. 1b depicts the same device 1 as FIG. 1a, but this time fitted out for bending small pairs of glass panes 11.1, 11.2 and 11.3. For this purpose, the transport molds 10.1, 10.2 and 10.3 suited to the size of the pairs 11 of glass panes have been mounted on the transport carriages 5.

In FIGS. 1a and 1b it can be seen that, according to the size of the pairs of glass panes, only the heating elements 4 positioned vertically above the glass panes are activated to heat the panes by radiation. Depending on the desired distribution of heating it is obviously also possible to disconnect some heating elements, for example those in the central part of the pairs of glass panes if, for example, it is necessary to avoid excessive curvature of the softened panes in this region. In the devices 1 of the prior art, the heating elements 4 can be operated to suit a heating pattern only within a chamber 2. In the drawing, the heating elements 4 that are not currently in use have been drawn in broken line.

As FIG. 1b shows, for glass panes of the size indicated and the predetermined fixed size of the transport carriages 5, it is possible to use only about half the length of the furnace line for heating the pairs 11 of panes. If glass panes of even smaller size are to be processed, the space used is even smaller. As has already been explained, the packing density cannot however be increased without problem, because if it were, then the glass panes would, in part, pass under the roof projections 3 which have no heating elements. That would cause a very uneven distribution of heat. In any event, it is, however, desirable for the number of glass panes within a furnace line to be as high as possible, because that makes it possible to increase production per unit time.

In the device 100 according to the invention for heating and/or bending glass panes, which has been depicted in FIGS. 2a and 2b, the heating elements 4 are positioned uninterruptedly along the entire length of the roof of the chambers 12.1, 12.2 and 12.3. In order to keep the distance between the heating elements 4 and the pairs 7.1, 7.2 and 7.3 of glass panes constant, the height of the downwardly-protruding roof projections 13.1, 13.2, 13.3 and 13.4 have been reduced. In addition, the heating elements 4 are connected no longer chamber by chamber to define defined heating patterns, but heating patterns can be created that extend beyond the limits of the chambers. The heating pattern suited to one particular pair of glass panes is therefore dependent upon the position of this pair within the furnace line. Thus, the transport carriages 14 can have a length independent of the dimensions of the chambers 12 of the furnace, and their position within the furnace line is independent of the limits 13 of the chambers.

FIG. 2b depicts the heat treatment of smaller glass panes in the device 100 according to the invention which was depicted in FIG. 2a. The three chambers 12.1, 12.2 and 12.3 depicted here again use five transport carriages 14.1 to 14.5 bearing respective transport molds 10.1 to 10.5 on which pairs of glass panes 11.1 to 11.5 are positioned. The transport carriages of the device 100 according to the invention are suited to the size of the smallest transport molds 10 used. If pairs of larger glass panes are to be bent, the appropriately-sized transport molds 6 overhang the transport carriages 14 in the way depicted in FIG. 2a.

The heating elements 4 are all operated according to the position of the pair 11 of glass panes, and are so outside of the structural boundaries of the chambers. In this way, it is possible to increase the throughput of glass panes heat treated by one to two thirds under the size conditions depicted here.

The depictions given in FIGS. 1 and 2 are merely schematic and, in particular, certain known details, for example the way in which the transport carriages are driven or the radiation screens provided on the transport molds have not been depicted therein.

FIG. 3 is a schematic horizontal section above the heating elements 4 in the region of the boundary between the chambers 12.1 and 12.2 of the device 100 according to the invention depicted in FIG. 2b. The interior space of the chamber is separated from the environment at the sides by the stonework 15 of the chamber. The pair 11.2 of glass panes has been depicted in broken line. The heating elements 4 positioned above the glass panes 11.2 have been activated and the elements 4' situated outside the projection of the glass panes 11.2 are not in use at this time. Certain heating elements situated outside the projection of the glass panes may also be used to regulate the temperature in certain zones of the furnace, without having a direct influence on the glass panes. The heating elements that are connected have been depicted in continuous line and the heating elements that are disconnected have been depicted using broken line. Obviously, the heating elements that are connected may also be operated as heating fields as the glass panes progress forwards, which fields progress with the pair of panes.

In the device according to the invention, the heating elements are of relatively small dimensions, measuring about 10 cm by 10 cm, and are here configured as the ceramic radiant heaters which are commonplace on the market. In these ceramic radiant heaters, electric heating wires are incorporated into the ceramic paste. In addition to ceramic radiant heaters it is also possible to use other appropriate types of heating element, for example elements with open heating spirals. The dimensions of the heating elements, whether these be ceramic radiant heaters or elements with open heating spirals, are obviously not limited to said size, and the heating elements may be of any size suited to the use and according to the geometric shape and size of the glass panes that are to be heated in the special furnace line. Likewise, the combination of heating elements of different dimensions is possible and necessary in many cases.

The invention claimed is:

1. A device for heating glass panes, comprising: a furnace line;
   plural supports that transport the glass panes through the furnace line, the glass panes being placed on the supports positioned on transport carriages;
   a drive device that progresses the transport carriages through the furnace line; and
   plural heating elements provided above the glass panes in the furnace line, the plural
   heating elements being mutually arranged along the direction of transport of the transport carnages;
   wherein the heating elements are positioned uninterruptedly above the entire furnace line and the heating elements can be operated and regulated so as to form heating zones suited to dimensions of the glass panes along the direction of transport of the transport carriages, and
   wherein the furnace line is divided into plural chambers arranged along the direction of transport of the transport carriages, which chambers include chamber boundaries between the chambers, which chamber boundaries extend transverse to the direction of transport of the transport carriages, the heating elements being positioned uninterruptedly above the entire furnace line including heating elements positioned below the boundaries between the chambers, and
   the heating zones suited to the dimensions of the glass panes and the chambers are independent of one another, and
   wherein plural heating elements provided in each of said chambers, and mutually arranged along the direction of transport of the transport carriages, are separately controllable with respect to one another to provide said heating zones.

2. The device as claimed in claim 1, wherein the supports are provided in a plurality of sizes including a smallest size, wherein the length of the transport carriages in the direction of transport is suited to a size of the smallest of the supports, so that larger supports overhang the transport carriages in the direction of transport.

3. The device as claimed in claim 1, wherein the supports include transport molds in a form of frames.

4. The device as claimed in claim 1, wherein the transport carriages each include their own drive device.

5. The device as claimed in claim 1, wherein the transport carriages can be moved in the transport path on a transport device, a chain, a bed of rolls, wheels, or a belt.

6. The device as claimed in claim 1, wherein at least one of acceleration and deceleration paths are provided in transition zones between the heating zones.

7. The device as claimed in claim 1, wherein the transport carriages or the supports are contiguous with one another, forming a continuous train of carriages such that when a first transport carriage is pushed to an entrance of the furnace line or when a last transport carriage is extracted from an exit of the furnace line, the entirety of the train of carriages can be progressed through the furnace line.

8. The device as claimed in claim 1, wherein the transport carriages can be progressed step by step and therefore discontinuously, with pauses between phases during which they progress through the furnace line.

9. The device as claimed in claim 1, wherein the transport carriages can be progressed through the furnace line continuously, and therefore without pauses, and for each glass pane a heating zone can be progressed forwardly in a controlled fashion in step with progress made by the glass panes.

10. The device as claimed in claim 1, wherein additional heating elements are positioned above and/or to the side of the glass panes.

11. The device as claimed in claim 1, wherein the glass panes are positioned horizontally on the supports that are transport molds, each transport mold carrying one or more glass panes positioned on top of one another, covering each other.

12. A method of heating at least one glass pane in a furnace including a furnace line including plural heating elements positioned above the glass panes, the method comprising:
   placing the glass panes on a support positioned on a transport carriage; transporting the supports positioned on the transport carriages and laden with glass panes through the furnace line, wherein the furnace line is divided into plural chambers that include chamber boundaries between the chambers, which chamber boundaries extend transverse to a direction of transport of the transport carriages, the heating elements being mutually arranged along the direction of transport of the transport carriages and positioned uninterruptedly above the entire furnace line, and including heating elements positioned below the boundaries between the chambers; and
   independently operating and regulating the heating elements in each of said plural chambers such that they form, independently of boundaries between the chambers of the transport path, heating zones for the glass panes, which zones correspond to a size and position of the glass panes in the transport path, wherein each support includes a transport mold, the glass panes being heated to their bending temperature while they are being transported through the furnace line, the glass panes being pre-bent on the transport molds and transferred at the end of the furnace line to another bending device that performs a final bending operation thereon.

* * * * *